Figure 3:
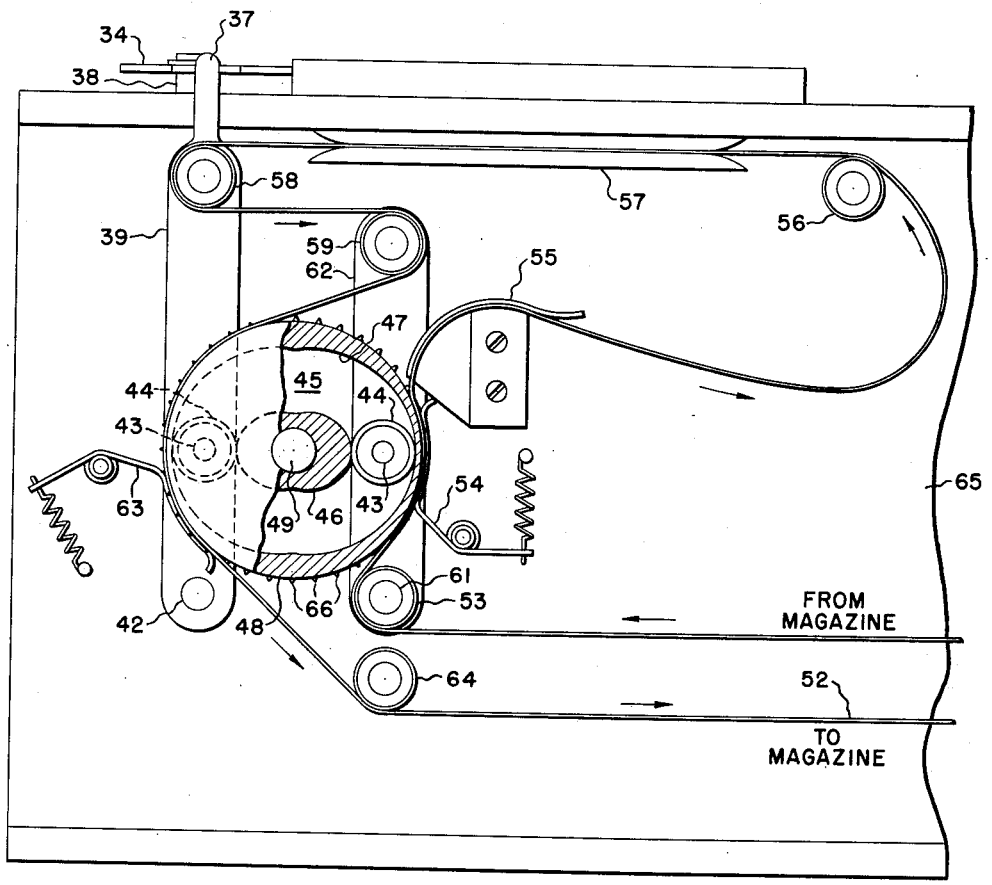

April 17, 1962  G. K. GANTSCHNIGG ET AL  3,029,688
CAMERA APPARATUS
Filed July 28, 1958  2 Sheets-Sheet 1
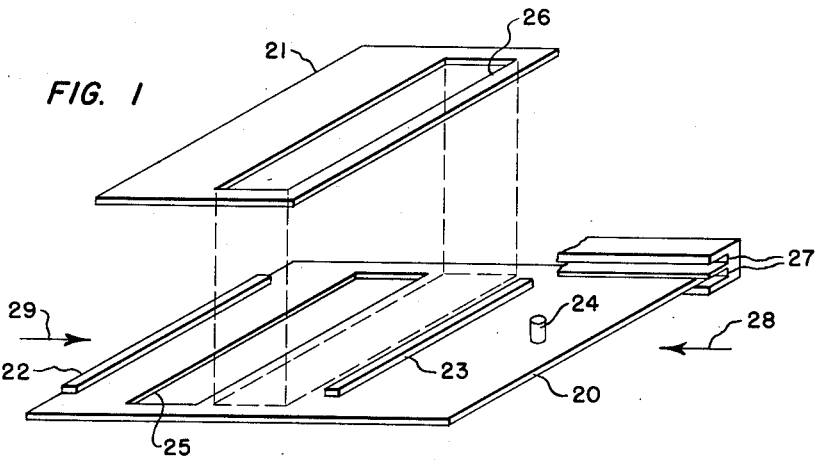
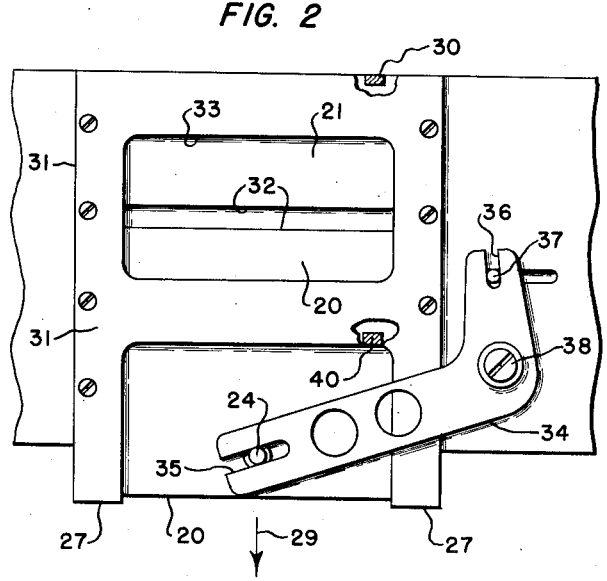
INVENTORS
GOTTFRIED K. GANTSCHNIGG
SIGURD ZIEGLER
BY
ATTORNEY April 17, 1962 G. K. GANTSCHNIGG ET AL 3,029,688
CAMERA APPARATUS
Filed July 28, 1958 2 Sheets-Sheet 2

INVENTORS
GOTTFRIED K. GANTSCHNIGG
SIGURD ZIEGLER
BY
ATTORNEY

United States Patent Office 3,029,688
Patented Apr. 17, 1962

3,029,688
CAMERA APPARATUS
Gottfried K. Gantschnigg and Sigurd Ziegler, San Diego, Calif., assignors to General Dynamics Corporation, San Diego, Calif., a corporation of Delaware
Filed July 28, 1958, Ser. No. 751,287
4 Claims. (Cl. 88—19.3)

The present invention generally relates to apparatus for moving the film and shutter of a motion picture camera, and more particularly relates to apparatus for rapidly exposing a wide strip of film in a series of long photographs or "frames."

The ability to expose a strip of film in a series of long frames makes it possible to easily photograph wide fields of vision. This capability is highly desired in many areas of photography such as the entertainment industry, aerial observation work, cartography, air to air gunnery, and many other fields of endeavor.

Formerly, cameras employing curtain type shutters have been used to properly expose large frames of film. These cameras, however, operate at low frame rates and only a few frames of film can be exposed per second. The present invention is not subject to this disadvantage for it can operate at relatively high frame rates and pulse rates.

Extremely large rotary disc shutter cameras have been used to expose large frames at high frame rates, but their size and weight makes them cumbersome and unsuitable for use in aircraft and other applications where size and weight are important factors. In contrast, cameras utilizing the present invention are particularly suited for use in aircraft because of their resultant small size and low weight.

In general, the present invention is comprised of a shutter, a shutter activating mechanism and a film transport mechanism.

An object of the present invention is to provide novel camera apparatus which facilitates photographing a wide field of vision.

Another object is to provide camera apparatus which can rapidly and properly expose a strip of film either in a series of large frames or a series of small frames.

Another object is to provide camera apparatus which can be continuously operated or pulse operated.

Another object is to provide novel camera apparatus particularly adapted for use in aircraft where the amount of camera space available is severely limited.

Other objects and features of the present invention will be readily apparent to those skilled in the art from the following specification and appended drawings wherein is illustrated a preferred form of the invention, and in which:

FIGURE 1 is an exploded view of a shutter,
FIGURE 2 is a plan view of a shutter, faceplate, and shutter lever, and
FIGURE 3 is a schematic of the shutter activating mechanism and film transport mechanism.

Referring now to the figures, a disassembled shutter is shown as being comprised of a slide plate 20 and an inertia plate 21. The slide plate contains stops 22, 23, and a pin 24. An aperture 25 is located in the slide plate 20, and an aperture 26 is positioned in inertia plate 21.

When the shutter is assembled in the camera the slide plate and inertia plate move back and forth in a guide or trackways 27. The trackways are closely stacked so that motion of the inertia plate 21 is limited by the protruding stops 22 and 23 of slide plate 20. The slide plate is forced to move rapidly back and forth and as a result the stops 22 and 23 move the inertia plate back and forth also. When the slide plate 20 is moving rapidly in the direction shown by arrow 28 then the inertia of inertia plate 21 causes it to ride against stop 23. With the plate 21 in this position its aperture 26 does not overlap aperture 25 of plate 20. This is shown by a dotted line projection of aperture 26 onto plate 20. Thus, with slide plate 20 moving in the direction of arrow 28 there is no overlap of apertures 25 and 26, and no light can pass through the shutter to cause film exposure.

This shutter motion takes place beneath a face plate 31 that contains a light opening 33 for admitting light to a strip of film. The face plate 31 also has a stop 30 and a stop 40 which protrude into the path of inertia plate 21. These stops are positioned near the trackways and do not interfere with motion of stops 22 and 23 of slide plate 20.

As slide plate 20 is moving in the direction of arrow 28 and as it decelerates and comes to a halt, the motion of inertia plate 21 is also brought to a halt by stop 30 of the faceplate. As slide plate 20 is subsequently forced to move in the direction indicated by arrow 29 the stop 22 contacts the inertia plate 21 at a time when the aperture 26 overlaps a portion of aperture 25 and a slot 32 is produced through which light can pass to expose film. This slot moves across light opening 33 to admit light to a strip of film and expose it. After the slot moves completely through opening 33 then the slide plate 20 is caused to stop and the inertia plate 21 is halted by stop 40 of the faceplate.

Thus, as slide plate 20 moves in one direction the slot admits light to the strip film and as it moves in the other direction the plates 20 and 21 overlap in a manner to close the slot. The strip of film beneath the shutter runs parallel with the length of the longitudinal light opening. The film can be held stationary and exposed when the shutter slot is open and it can be moved to bring unexposed film into position when the shutter slot is closed. The length of the photograph or frame produced depends on the length of the slot 32 and light opening 33. It should be apparent that very long frames can be achieved by this type of shutter.

The width of the slot, and thus the amount of light admitted, can be made adjustable by making stop 22 an adjustable stop. The shutter can also be made to operate without stops 30 and 40 of the faceplate. This would mean that after slide plate 20 was caused to stop the inertia plate would continue until friction or the stop 22 or 23 of the slide plate stopped its motion.

Regardless of whether stops 30 and 40 are used, however, if slot 32 is moved across opening 33 at a constant velocity then all of the film beneath the shutter and opening 33 will be evenly exposed, each portion of film having been subjected to light for the same amount of time.

In FIGURE 2 a lever 34 is shown which imparts motion to the slide plate 20. Lever 34 contains a slot 35 which embraces pin 24 of slide plate 20 and a slot 36 which embraces an arm extension 37. The pin 24 and extension 37 are free to move in their respective slots, with movement of extension 37 causing lever 34 to pivot about pin 38 and move pin 24 and attached slide plate 20. If extension 37 moves at a constant velocity then the slide plate 20 will be forced to move at a constant velocity also.

Although only one type of linkage is shown to connect extension 37 to slide plate 20 it is understood that there are many suitable linkages, particularly gears, which can be used to transmit the constant velocity of extension 37 into a constant velocity of slide plate 20. And, although FIGURES 1 and 2 show inertia plate 21 positioned above slide plate 20, their order can be reversed and they will operate as long as the two plates are normally adjacent each other. The shutter can be also turned 90° and the slot 32 moved along the length of the film to produce the same even exposure. In addition, it is possible to have the slide plate 20 and inertia plate 21 each contain a plurality of apertures so that they appear as two ladders, one above the other. Still further, the two plates of the shutter can be curved instead of flat and the shutter will still be operative. All of these modifications, however, can utilize the constant velocity of arm extension 37.

FIGURE 3 illustrates the shutter activating mechanism which produces the constant velocity of arm extension 37. In this figure the arm extension 37 is shown as an integral part of an arm 39. Arm 39 pivots about pivot pin 42 which is positioned therethrough and which is located at its lower extremity. A bearing pin 43, shown by dashed lines, is connected to arm 39 in such a manner that it protrudes normally therefrom. A roller or bearing 44 is positioned on pin 43 so that the bearing is free to rotate about pin 43. An acceptable alternate configuration would be to have bearing 44 rigidly attached to pin 43 with pin 43 connected to arm 39 in a manner that would permit pin 43 to rotate. Bearing 44 rides in a cam groove 45 which has an inner cam surface 46 and an outer cam surface 47. A portion of the cam groove is shown broken out and a portion is shown by dashed lines. The cam groove is attached to, or part of, a sprocket wheel 48 which is rigidly fixed to a shaft 49 that continually rotates at a substantially constant speed. This shaft is connected to a conventional motor, and as the shaft and sprocket wheel rotate the cam groove rotates also and the bearing 44 and arm 39 are forced to move alternately toward and away from the shaft or axis of revolution. The cam surfaces 46 and 47 are such that the bearing experiences a substantially constant linear velocity during most of its cycle.

The arc through which arm 39 and attached bearing 44 are forced to swing is so small that any point on the arm travels along a line which is substantially a straight line. Thus, the arm extension 37 also experiences a substantially constant velocity during most of its cycle. The cam surfaces can be easily designed by one skilled in the art if the motion requirements of bearing 44 are kept in mind. The outer cam surface can be derived merely by adding to the radii of the inner cam surface a distance that is slightly greater than the diameter of bearing 44. The inner cam must be such as to produce linear velocity of bearing 44 as the shutter slot 32 moves across the light opening 33, or as bearing 44 moves toward shaft 49. The cam surface 46 is also designed so that one-half cycle of bearing motion corresponds to a 90° rotation of cam surface 46. FIGURE 3 shows bearing 44 in a position where it is about to begin a shutter opening stroke. As cam 46 rotates counterclockwise the bearing will begin to move inwardly along a substantially straight line toward the axis of rotation. In order for the motion to be a substantially constant velocity then the distance traveled along the line per unit of time should be substantially constant. If the radius of cam 46 is called "X" then making the cam so that "X" decreases a constant amount per degree for an arc of 90° will produce the desired constant velocity of bearing 44 as it moves toward the axis of rotation. However, because it is not possible to instantaneously move the bearing from zero velocity to some constant velocity, the first few degrees of rotation of the cam surface 46 are used to accelerate the bearing up to the desired constant velocity. The shutter is designed so that the slot 32 does not emerge into the light opening 33 until the cam 46 has rotated sufficiently to produce a constant velocity, and this is true whether stops 30 and 40 are used or not. A similar procedure is followed in order to decelerate the shutter and shutter activating mechanism at the end of the shutter stroke. The last few degrees of the 90° arc are used to decelerate the bearing 44 from a substantially constant velocity to zero velocity. The shutter slot 32 has passed beyond light opening 33 when the deceleration occurs. The preferred embodiment of the cam, as shown in FIGURE 3, is designed to produce the same substantially constant velocity on the return stroke of the bearing 44 and attached mechanisms. It is understood, however, that it is not necessary to move the shutter at a constant velocity on the return or close stroke. All that is required on the return stroke of the shutter is that the motion be such as to keep inertia plate 21 riding against stop 23 of slide plate 20 until nearing the end of the return stroke.

The return stroke occurs during the next 90 degrees of rotation so that one complete cycle of the shutter corresponds to 180 degrees of rotation of the cam groove. Should it be desired to use a shutter having different velocity requirements then they can be met by merely providing the proper cam surfaces.

It is understood that one cam surface alone could produce the desired motion if means for holding the bearings against the surface were provided. It is conceivable that a spring or springs connected between the movable arms 39 and 62 would provide one such means.

The shutter activating mechanism described above, while designed to provide the desired shutter motion, is also an important and integral part of the film transport mechanism. FIGURE 3 shows a strip of film 52 entering from a magazine. The film rides over a roller 53 and then between the sprocket wheel 48 and a fence 54. Leaving the sprocket wheel and fence 54 the film follows fence 55 and continues on to ride about roller 56 and enter film gate 57 where it is exposed to light during the opening strokes of the shutter. Exposed film leaves the film gate to proceed around a roller 58 attached to arm 39, part of the shutter activating mechanism, and then around a roller 59 attached to an arm 62 which pivots about pivot pin 61. Upon leaving roller 59 the film travels on sprocket wheel 48 past fence 63, then leaves the sprocket wheel to travel around roller 64 and return to the magazine. Some of the rollers are attached to the camera case 65 while others are attached to movable arms 39 and 62. It is preferred, however that all of the rollers be free to rotate with the film as it travels along. The fences are all attached to the camera case, with fences 54 and 63 being spring loaded in the conventional manner to hold the film firmly against the sprockets 66 of sprocket wheel 48.

The sprocket wheel turns continually at a substantially constant rate, drawing film from the magazine and sending it on toward the film gate. The motion of the film through the film gate is not continuous however, for it must be stationary in the gate during those periods when the shutter slot 32 is open and traveling across light opening 33. During the return, or closed, stroke of the shutter the entire exposed area or frame of film must be withdrawn from the gate. This, of course, will place a new frame of unexposed film in the gate in preparation for the next open stroke of the shutter. Since long frames of film are exposed by the shutter then a considerable length of film must be pulled from the gate as the shutter makes its closed stroke. This is accomplished by the combined action of arms 39 and 62, and sprocket wheel 48 which contains cam groove 45.

In FIGURE 3 the arms 39 and 62 are shown in their fully spread position. As the cam groove 45 rotates counterclockwise the two arms are forced to move together and as they do so they leave a loose loop of film which the rotating sprocket wheel gathers and sends back toward the magazine. As the arms decelerate and reach their minimum separation distance the collapsing loop of film catches up with the arm rollers 58 and 59 so that any further rotation of the sprocket wheel will pull film around these rollers and thus pull film from the film gate 57. During the 90 degrees of rotation just described there is no movement of the film in the film gate. This is the open shutter stroke during which the film in the film gate is exposed.

As cam groove 45 continues to rotate the arms 39 and 62 are forced apart. The rollers 58 and 59 are caused to separate and, since the film is wound around these rollers, the motion causes a length of film to be pulled from the gate. In addition, the sprocket wheel continues to rotate and in so doing it pulls film around rollers 58 and 59 and thence from gate 57. A considerable length of film is thus pulled from the gate by the coordinated action of the arms and the sprocket wheel. During this closing stroke, in which the shutter slot is closed, the sprocket wheel rotates another 90 degrees. The action of the sprocket wheel pulls one-half frame from the film gate and the separating action of rollers 58 and 59 is such that it pulls the other half frame from the film gate. This means that during any 90 degrees of rotation the sprocket wheel will collect or move a length of film equal to one-half the length of a frame. To achieve this the total number of sprockets 66 on sprocket wheel 48 should be equal to twice the number of film perforations per frame.

As previously described, the separating action of arms 39 and 62 pulls an additional half-frame length of film into the loop of film wound about rollers 58 and 59. During the closing stroke of arms 39 and 62, when the loop is loose, the 90 degree rotation of the sprocket wheel removes this additional half-frame length of film from the loop. Thus, while the sprocket wheel continuously returns film to the magazine the film in the film gate experiences only intermittent motion.

In addition to continuously returning film to the magazine, the sprocket wheel also continuously extracts film from the magazine at the same rate. The extracted and unexposed film which leaves the sprocket wheel is fed into a loop preceding the film gate. Film enters this loop at the rate of one frame length per 180 degrees of sprocket wheel rotation. Film is pulled from this loop into the gate by the combined action of the arms and sprocket wheel previously described. During the 90 degree open stroke no film is removed from the loop and during the subsequent 90 degree closing stroke one whole frame length of film is pulled from the loop into the gate.

As thus described, the present invention includes apparatus which rapidly and evenly exposes a wide strip of film in a series of long frames. In addition, the apparatus is such that it need not operate in a continuous fashion but may instead operate in a pulsed mode where only one or a few frames are exposed at a time.

While certain preferred embodiments of the invention have been specifically disclosed, it is understood that the invention is not limited thereto as many variations will be readily apparent to those skilled in the art and the invention is to be given its broadest possible interpretation within the terms of the following claims.

We claim:

1. A camera apparatus comprising, in combination, a case, shutter means carried by said case and including a guide, a faceplate positioned over said guide and having a light opening therein, a slide plate having a light aperture therein and a stop protruding from its face, an inertia plate having a light aperture therein, said inertia plate and said slide plate being slidably received within said guide for individual movement with their faces adjacently positioned, said stop of said slide plate controlling relative movement between said inertia plate and said slide plate to produce a traveling light opening by aligning at least a portion of said apertures in said inertia plate and in said slide plate with each other and with the opening in said faceplate, means operably connected to said slide plate to impart to and fro movement thereto thereby to cause said inertia plate to abut said stop to provide said alignment of said apertures and said opening as said slide plate is propelled in one direction of said movement, said movement imparting means including a first arm operably connected to said slide plate and pivotally mounted within said case and carrying a film roller and a bearing member intermediate said film roller and the axis of arm pivot, a sprocket wheel rotatably mounted within said case having formed in a face thereof a cam shaped to engage said bearing member thereby to drive said arm and its film roller in to and fro movement upon cam rotation, said movement in at least one direction being at a substantially constant velocity with substantially constant rotation of said cam, said constant velocity movement being imparted to said shutter means during said aperture and opening alignment to provide an even exposure of film when positioned adjacent said shutter means, means for transporting film to a position adjacent said shuter means for said even exposure including a second arm pivotally mounted within said case and carrying a film roller and a bearing member intermediate said film roller and the axis of second arm pivot, said film roller of the second arm being generally opposite the film roller of the first arm and positioned such that said film may be entrained about said rollers in an S-shaped loop, the bearing of said second arm being engaged by said cam for driving said second arm and its film roller in to and fro movement relative to said first arm such that said rollers coact in alternately expanding and contracting the film when S-looped about the film rollers, causing the film to move only when said opening and apertures are out of said alignment as determined by said movement of said first arm through said operable connection with said slide plate, said sprocket wheel continually drawing film toward the shutter means for exposure and drawing film away from said shutter means after exposure during said to and fro movement of said second arm.

2. A camera apparatus comprising, in combination, a case, shutter means carried by said case and including a guide, a faceplate positioned over said guide having a light opening therein, a slide plate having a light aperture therein, an inertia plate having a light aperture therein, said inertia plate and said slide plate being slidably received within said guide for individual movement with their faces adjacently positioned, stop means for controlling relative movement between said inertia plate and said slide plate to produce a traveling light opening by aligning at least a portion of said apertures in said inertia plate and in said slide plate with each other and with the opening in said faceplate, means operably connected to said slide plate to impart to and fro movement thereto thereby to cause said inertia plate to abut said stop means to provide said alignment of said apertures and said opening as said slide plate is propelled in one direction of said movement, said movement imparting means including a first arm operably connected to said slide plate and pivotally mounted within said case and carrying a film roller and a bearing member intermediate said film roller and the axis of arm pivot, a sprocket wheel rotatably mounted within said case upon a shaft which carries a cam for rotation with said sprocket, said cam being shaped to engage said bearing member thereby to drive said arm and its film roller and the slide plate operably connected to said arm in to and fro movement upon cam rotation, means for transporting film to a position adjacent said shutter means for exposure including a second arm pivotally mounted within said case and carrying a film roller and a bearing member intermediate said film roller and the axis of second arm pivot, said film roller of the second arm being generally opposite the film roller of the first arm and positioned such that said film may be entrained about said rollers in an S-shaped loop, the bearing of said second arm being engaged by said cam for driving said second arm and its film roller in to and fro movement relative to said first arm such that said rollers coact in alternately expanding and contracting the film when S-looped about the film rollers, causing the film to move only when said opening and apertures are out of said alignment as determined by said movement of said first arm through said operable connection with said slide plate, said sprocket wheel continually drawing film toward the shutter means for exposure and drawing film away from said shutter means after exposure during said to and fro movement of said second arm.

3. A camera apparatus comprising, in combination, a case, shutter means carried by said case and including a guide, a faceplate positioned over said guide having a light opening therein, a slide plate having a light aperture therein, an inertia plate having a light aperture therein, said inertia plate and said slide plate being slidably received within said guide for individual movement with their faces adjacently positioned, stop means for controlling relative movement between said inertia plate and said slide plate to produce a traveling light opening by aligning at least a portion of said apertures in said inertia plate and in said slide plate with each other and with the opening in said faceplate, means operably connected to said slide plate to impart to and fro movement thereto thereby to cause said inertia plate to abut said stop means to provide said alignment of said apertures and said opening as said slide plate is propelled in one direction of said movement, said movement imparting means including a first arm operably connected to said slide plate and pivotally mounted within said case and carrying a film roller and a bearing member intermediate said film roller and the axis of arm pivot, a sprocket wheel rotatably mounted within said case having formed in a face thereof a cam shaped to engage said bearing member thereby to drive said arm and its film roller and the slide plate operably connected to said arm in to and fro movement upon cam rotation, means for transporting film to a position adjacent said shutter means for exposure including a second arm pivotally mounted within said case and carrying a first film roller and a second guiding roller disposed adjacent said sprocket wheel for directing film thereover in travel toward the shutter means, a bearing member intermediate said film roller and the axis of second arm pivot, said film roller of the second arm being generally opposite the film roller of the first arm and positioned such that said film may be entrained about said rollers in an S-shaped loop, the bearing of said second arm being engaged by said cam for driving said second arm and its film roller in to and fro movement relative to said first arm such that said rollers coact in alternately expanding and contracting the film when S-looped about the film rollers, causing the film to move only when said opening and apertures are out of said alignment as determined by said movement of said first arm through said operable connection with said slide plate, said sprocket wheel continually drawing film toward the shutter means for exposure and drawing film away from said shutter means after exposure during said to and fro movement of said second arm.

4. A camera apparatus comprising, in combination, a case, shutter means carried by said case and including a guide, a faceplate positioned over said guide having a light opening therein, a slide plate having a light aperture therein, an inertia plate having a light aperture therein, said inertia plate and said slide plate being slidably received within said guide for individual movement with their faces adjacently positioned, stop means for controlling relative movement between said inertia plate and said slide plate to produce a traveling light opening by aligning at least a portion of said apertures in said inertia plate and in said slide plate with each other and with the opening in said faceplate, means operably connected to said slide plate to impart to and fro movement thereto thereby to cause said inertia plate to abut said stop means to provide said alignment of said apertures and said opening as said slide plate is propelled in one direction of said movement, said movement imparting means including a first arm operably connected to said slide plate and pivotally mounted within said case and carrying a film roller and a bearing member intermediate said film roller and the axis of arm pivot, a sprocket wheel rotatably mounted within said case to one side of and adjacent the intermediate portion of said first arm and having formed in a face thereof a cam shaped to engage said bearing member thereby to drive said arm and its film roller in to and fro movement upon cam rotation, said movement in at least one direction being at a substantially constant velocity with substantially constant rotation of said cam, said constant velocity movement being imparted to said shutter means during said aperture and opening alignment to provide an even exposure of film when positioned adjacent said shutter means, means for transporting film to a position adjacent said shutter means for said even exposure including a second arm pivotally mounted within said case adjacent to said sprocket wheel and with said first arm generally straddling same, said second arm carrying a first film roller and a second guiding roller disposed adjacent said sprocket wheel for directing film thereover in travel toward the shutter means and a bearing member intermediate said film roller and the axis of second arm pivot, said film roller of the second arm being generally opposite the film roller of the first arm and positioned such that said film may be entrained about said rollers in an S-shaped loop, the bearing of said second arm being engaged by said cam for driving said second arm and its film roller in to and fro movement relative to said first arm such that said rollers coact in alternately expanding and contracting the film when S-looped about the film rollers, causing the film to move only when said opening and apertures are out of said alignment as determined by said movement of said first arm through said operable connection with said slide plate, said sprocket wheel continually drawing film toward the shutter means for exposure and drawing film away from said shutter means after exposure during said to and from movement of said second arm.

References Cited in the file of this patent

UNITED STATES PATENTS

| | | |
|---|---|---|
| 438,943 | Perry | Oct. 21, 1890 |
| 675,781 | Macdonald | June 4, 1901 |
| 960,793 | Bingham | June 7, 1910 |
| 1,020,383 | Cameron | Mar. 12, 1912 |
| 1,115,538 | Hochstetter | Nov. 3, 1914 |
| 1,151,760 | Cameron | Aug. 31, 1915 |
| 1,188,074 | Hochstetter | June 20, 1916 |
| 1,984,620 | Anderson | Dec. 18, 1934 |
| 2,152,221 | Steiner | Mar. 28, 1939 |
| 2,225,832 | Holbrook | Dec. 24, 1940 |
| 2,349,941 | Cramwinckel et al. | May 30, 1944 |
| 2,762,255 | Anderson | Sept. 11, 1956 |

FOREIGN PATENTS

| | | |
|---|---|---|
| 623,018 | Great Britain | May 11, 1949 |
| 728,796 | Great Britain | Apr. 27, 1955 |